(12) United States Patent
Brooks, V et al.

(10) Patent No.: US 10,614,454 B1
(45) Date of Patent: Apr. 7, 2020

(54) REMOTE POPULATION AND REDACTION OF HIGH SECURITY DATA

(71) Applicant: Amazon Technologies, Inc., Seattle, WA (US)

(72) Inventors: Alfred Austin Brooks, V, Seattle, WA (US); Elizabeth Coffin Lebeau, Snohomish, WA (US); Matthew Stephen Miller, Seattle, WA (US); Anthony Tsun-Ming Poon, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 904 days.

(21) Appl. No.: 14/752,114

(22) Filed: Jun. 26, 2015

(51) Int. Cl.
  *G06Q 40/00* (2012.01)
  *G06Q 20/38* (2012.01)

(52) U.S. Cl.
  CPC .................. *G06Q 20/382* (2013.01)

(58) Field of Classification Search
  CPC ......... G06Q 40/06; G06Q 40/04; G06Q 30/02
  USPC ....................................................... 705/36 R
  See application file for complete search history.

(56) References Cited

U.S. PATENT DOCUMENTS

| | | | | |
|---|---|---|---|---|
| 6,321,334 | B1 * | 11/2001 | Jerger ..................... | G06F 21/54 726/1 |
| 9,178,867 | B1 * | 11/2015 | Letz ..................... | H04L 12/6418 |
| 9,294,440 | B1 * | 3/2016 | Conner ............... | H04L 63/0281 |

OTHER PUBLICATIONS

Computer Systems Security and Support for Internet Voting System. International Journal of Engineering Applied Sciences and Technology. vol. 1, Issue 9, ISSN No. 2455-2143, pp. 50-53. (Year: 2016).*
Compartmentalization Architectures for Protection of Internet Credentials and Transactions from CPU Resident Malware. World Congress on Internet Security (WorldCIS-2012) (Year: 2012).*
Transaction Security System. Abraham, Dolan, Double, and Stevens. IBM Systems Journal, vol. 30, No. 2, 1991. (Year: 1991).*

\* cited by examiner

*Primary Examiner* — Alexander G Kalinowski
*Assistant Examiner* — John O Preston
(74) *Attorney, Agent, or Firm* — Lee & Hayes, P.C.

(57) ABSTRACT

Technologies for remote population and redaction of high security data are disclosed. A system in a low security zone that does not have access to high security data, such as credit card numbers, can provide instructions to a system in a high security zone for populating an outgoing message with high security data. The system in the high security zone can utilize the instructions to populate the outgoing message with the high security information and provide the outgoing message to an external endpoint, such as a third-party payment processor. The system in the high security zone can also redact high security data contained within an incoming message received from the endpoint before the incoming message is provided to the system in the low security zone.

20 Claims, 10 Drawing Sheets

CREATION OF IN-MEMORY REQUEST OBJECT

US 10,614,454 B1

REMOTE POPULATION AND REDACTION OF HIGH SECURITY DATA

BACKGROUND

Electronic commerce transactions between an online merchant and its customers frequently involve the online merchant interacting with one or more third-party payment processors. For example, an online merchant might utilize one or more third-party payment processors to obtain a payment approval or guarantee for a customer purchase made using a credit card or another type of payment transaction.

In some installations, server computers utilized by an online merchant are compartmentalized into groups, which might be referred to herein as "zones." For example, a high security zone might be created in a data center that includes server computers configured to perform tasks that require a very high level of security and trust. The server computers in such a high security zone might maintain credit card information or other types of high security data and perform payment-processing services, for instance. High security zones are commonly secured both physically, through the use of physical access control mechanisms configured to restrict access to the high security zone to a typically limited number of authorized personnel, and electronically, through the use of devices designed to monitor and control incoming and outgoing network traffic.

In some installations, one or more low security zones might also be utilized within a data center that do not include all of the physical and network access control mechanisms used in high security zones. For instance, an organization might maintain a high security zone that is restricted to a very small number of authorized employees and one or more low security zones that include server computers that are accessible to a larger group of employees.

In order to interact with third-party payment processors such as those described above, it is commonly necessary for program code that is specific to a particular third-party payment processor to access high security data, such as customer credit card numbers. However, due to restrictions imposed on computer systems in high security zones and, potentially, due to the limited number of personnel that typically have access to high security zones, it can be difficult to deploy and maintain payment processor specific program code on server computers located in high security zones. Consequently, it can be difficult for merchants to integrate with a large number of third-party payment processors in an efficient and highly secure fashion.

The disclosure made herein is presented with respect to these and other considerations.

DETAILED DESCRIPTION

Figure 1:
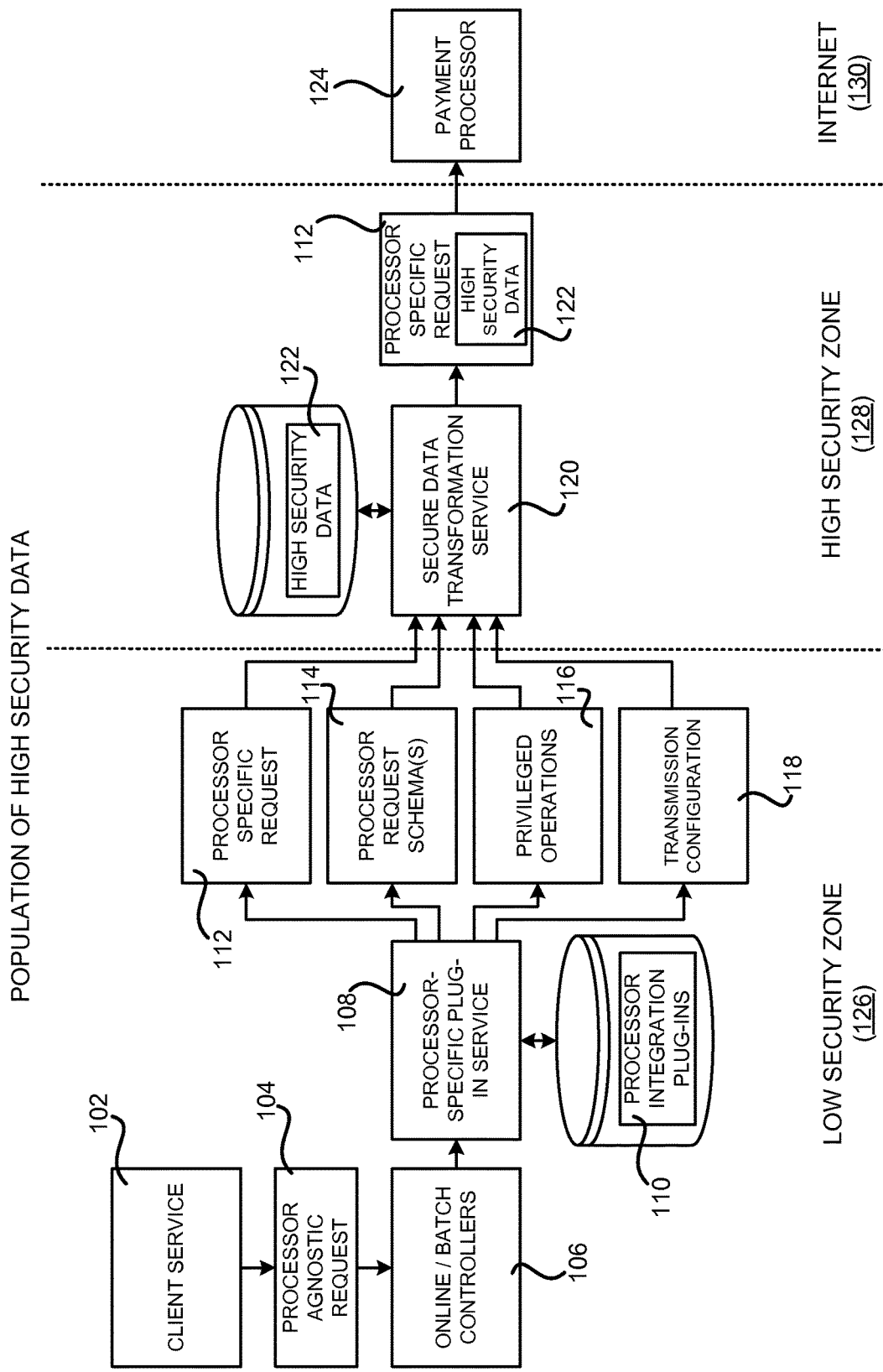
FIG. 1 is a software architecture diagram showing an overview of one illustrative mechanism described herein for remote population of high security data.

The following detailed description is directed to technologies for remote population and redaction of high security data. Utilizing the technologies described herein, payment processor specific program code can be executed outside of a high security zone where high security data is maintained. The payment processor specific program code can provide instructions to a service executing within the high security zone to populate an outgoing message, such as a payment processor request, with high security data and to transmit the populated message to the payment processor.

In a similar fashion, the service executing within the high security zone can redact or remove high security data from an incoming messages, such as a reply message provided by the payment processor, before providing the message to the payment processor specific program code executing outside of the high security zone. In this way, payment processor specific program code does not need to be deployed to computing systems within the high security zone, and the number of employees that need access to the high security zone in order to support multiple payment processors can be reduced.

In order to provide the functionality described briefly above, payment processor specific program code may be executed outside of a high security zone. The payment processor specific program code can generate a request to a network service executing within the high security zone, which might be referred to herein as the "secure data transformation service" or "SDTS", to populate a processor specific request with high security data and to transmit the request to a particular payment processor. The request made by the processor specific program code executing outside the high security zone to the SDTS does not include high security data.

The request to the SDTS can specify one or more payment processor request schemas (which might be referred to simply as "request schemas" or a "request schema"). The request schemas can include a format schema that defines a format of the payment processor specific request. The format schema can be specified by a payment processor, for example. The request schemas can also include a security classification schema that defines a security level for fields of a payment processor specific request. For example, and without limitation, the security classification schema might indicate whether a particular field contains high security data or data of a lower security classification. The security classification schema can be utilized to validate privileged operations performed within the high security zone to ensure that only specified fields include high security data. In this way, the security classification schema can limit the type of privileged operations that can be performed within the high security zone.

The request to the SDTS can also include a pre-formatted processor specific request that does not include high security data and one or more privileged operations that are to be performed within the high security zone in order to populate the processor specific request with high security data. In response to receiving such a request, the SDTS utilizes the request schemas to execute the specified privileged operations to generate a processor specific request that includes high security data. For example, and without limitation, in one configuration, the SDTS creates an in-memory request object that includes "getter" and "setter" methods that can be utilized by services executing within the high security zone in order to read and set fields of the in-memory request object, respectively, with the appropriate high security data. The processor specific request can be generated from the in-memory request object and transmitted to the appropriate payment processor. Other mechanisms might also be utilized.

A payment processor can also generate a reply that includes high security data. For example, and without limitation, in response to receiving such a reply, the SDTS can utilize a reply schema and one or more data policies to redact or remove high security data from the reply before providing the reply in response to the original request. In this way, program code executing outside of the high security zone can interact with the payment processor without having direct access to the high security data, and in a manner that is designed to eliminate the possibility that high security data is provided outside the high security zone.

It should be appreciated that while the technologies disclosed herein are primarily presented in the context of e-commerce systems and third-party payment processors, the technologies disclosed herein can be utilized in other environments, by other types of merchants, and with endpoints other than third-party payment processors. Additional details regarding the various components and processes described above for remote population and redaction of high security data will be presented below with regard to FIGS. 1-9.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable electronic devices, minicomputers, mainframe computers, handheld computers, personal digital assistants, e-readers, cellular telephone devices, special-purposed hardware devices, network appliances, and the like. The configurations described herein might also be practiced in distributed computing environments, where tasks can be performed by remote computing devices that are linked through a communications network. In a distributed computing environment, program modules can be located in and executed from both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

As discussed briefly above, an online merchant might operate a merchant system (not shown in FIG. 1) that provides a World Wide Web ("Web") store or other type of online marketplace (not shown) from which customers of the online merchant might purchase, rent, or otherwise obtain items. The items offered through the online marketplace might be physical items or digital items, such as audio and video files that are delivered digitally. In this regard, it should be appreciated that the configurations disclosed herein are not limited to use by an online merchant and might also be utilized by other types of merchants and entities.

The customers of the online merchant that operates the merchant system might utilize client computing systems (not shown) to engage in various types of interactions with the merchant system. For example, a customer might utilize a client computing system in order to place an order for the purchase or rental of a physical or digital item. Customers of the online merchant might also perform other types of interactions with the merchant system in order to initiate a transaction. It should be appreciated that the term "customer" as utilized herein might refer to an individual or organization purchasing items through the merchant system, a seller of items on a marketplace provided by the merchant system, a developer of software sold through a software application store provided by the merchant system, a publisher of a book or other type of publication that is offered for sale through an electronic book store provided by the merchant system, or another type of individual, for-profit, non-profit, or government entity.

Customers of the merchant system typically possess one or more payment instruments issued by one or more financial institutions (not shown in FIG. 1). For example, customers of the merchant system might possess one or more credit cards, charge cards, stored value cards, ATM cards, and/or other types of payment instruments. Customers of the merchant system might provide information about their payment instruments (e.g. credit card number, expiration date, name on the account, etc.) to the merchant system for use in paying for purchased or rented items.

In order to handle the processing of payments and other types of financial transactions, a merchant system might be configured in various configurations with a payments system, aspects of which are illustrated in FIG. 1. A payments system provides functionality for, among other things, processing of payments made by customers for the purchase or rental of items from a merchant system. A payments system might also provide functionality for processing refunds and other types of financial transactions.

Various other components within a merchant system might interact with a payments system in order to initiate the processing of financial transactions. For instance, in the example configuration shown in FIG. 1, a client service 102 associated with the provision of an online marketplace might submit requests to authorize or complete financial transactions by way of a payment processor 124. Many other components within a merchant system not illustrated in FIG.

1 might also utilize services provided by a payments system in order to complete financial transactions.

One particular type of processing performed by a payments system involves interaction with one or more third-party payment processors 124 (which might be referred to herein simply as "a payment processor 124" or a "processor 124"). For example, a component within the system illustrated in FIG. 1, might utilize the payment instrument information for a customer and the transaction amount (i.e. the cost of items and any associated taxes and/or fees) to obtain authorization and/or a payment guarantee from a payment processor 124. Although only a single payment processor 124 is illustrated in FIG. 1, it should be appreciated that the technologies disclosed herein can be utilized with many such payment processors 124.

The third-party payment processors 124 might include, for example, one payment processing system for each type of payment instrument, such as systems that act as intermediaries between a merchant and the financial institutions that provide payment instruments of that type. The third-party processors 124 might be credit card payment processing systems, an automated clearinghouse ("ACH"), or another type of system configured to provide a payment approval or guarantee for a customer.

When provided with information about a transaction amount (or an amount to be held or reserved for later payment) and a payment instrument (e.g. a particular credit card, bank, or other financial account) for a particular person or entity, a third-party payment processor 124 might reply with an approval of the transaction, a soft decline (e.g. when a credit card is over its limit, an expiration date is near or has passed, or the payment instrument issuer is unavailable), or a hard decline (e.g. a credit card has been reported lost or stolen). Payment transaction messages for which certain types of responses (e.g. soft declines) are received might be resubmitted at a later time for approval.

As discussed briefly above, components in the payment processing system shown in FIG. 1 can be segregated into a high security zone 128 and a low security zone 126. As also discussed briefly above, the high security zone 128 can include one or more computing systems that are configured to perform tasks that require a high level of security and trust, such as storing and operating on high security data 122. High security data 122 can include, for example, customer credit card numbers, bank account information, or other types of highly sensitive data.

The high security zone 128 can be secured physically, through the use of physical access control mechanisms like server cages, electronically-limited physical access, and others. The high security zone 128 can also be secured electronically, such as through the use of devices designed to monitor and control incoming and outgoing network traffic. As an example, the high security zone 128 might be secured from other zones and networks through the use of one or more firewalls. Other types of devices might also be utilized to physically and electronically secure the computing systems in the high security zone 128. Computing systems operating within the high security zone 128 might be referred to individually as "trusted computing systems."

The low security zone 126 is a group of computing systems that does not typically include all the physical and network access control mechanisms used in the high security zone 128. For instance, an organization might maintain a high security zone 128 that is physically and logically restricted to a very small number of authorized employees and a low security zone 126 that includes computing systems that are accessible to a much larger group of employees.

Computing systems operating in the low security zone 126 might be referred to individually as "untrusted computing systems." In this regard, it should be appreciated that the untrusted computing systems operating in the low security zone 126 are not typically operated in an insecure or untrustworthy manner. Rather, the untrusted computing systems are operated in a manner that is less secure than the computing systems operating in the high security zone 128. Thus, from the perspective of the computing systems operating in the high security zone 128, the computing systems in the low security zone 126 can be considered to be untrustworthy.

As mentioned briefly above, in order to interact with third-party payment processors 124 such as those described above, it is commonly necessary for program code that is specific to the third-party payment processors 124 to access the high security data 122. However, due to restrictions imposed on computer systems in the high security zone 128 and, potentially, due to the limited number of personnel that typically have access to the high security zone 128, it can be difficult to deploy and maintain payment processor specific program code on computing systems located in a high security zone 124. Consequently, it can be difficult for an online merchant to integrate with a large number of third-party payment processors 124 in a highly secure fashion.

In order to address at least some of the considerations set forth above, and potentially others, the payments system illustrated in FIG. 1 is configured in some implementations disclosed herein to provide functionality for executing payment processor specific program code outside the high security zone 128 that can provide instructions to a service executing within the high security zone 128 (e.g. the secure data transformation service 120 ("SDTS")) to populate a processor specific request 112 (which might be referred to herein as an "outgoing message") with high security data 122 and to transmit the populated message to the payment processor 124. Although the processor specific request 112 is primarily described herein as a "request" to a payment processor 124, the technologies disclosed herein can be utilized to create other types of outgoing messages that include high security data 122 from the high security zone 128. Accordingly, the processor specific request 112 described herein is not limited to being a request. Additional details regarding a mechanism for remote population of a message with high security data 122 are provided below with regard to FIGS. 1 and 2A-2B.

In a similar fashion, the SDTS 120 executing within the high security zone 128 can redact or delete high security data 122 from a reply message (not shown in FIG. 1) provided by the third-party payment processor 124 before providing the reply to the payment processor specific program code executing outside the high security zone 128. In this way, the payment processor specific program code does not need to be deployed to the high security zone 128, and the number of employees that need access to the high security zone 128 in order to support multiple third-party payment processors 124 can be reduced. Additional details regarding a mechanism for remote redaction of high security data 122 from a reply message provided by a payment processor are provided below with regard to FIGS. 3 and 4.

As shown in FIG. 1 and described briefly above, a client service 102 might need to utilize functionality provided by a payment processor 124. For example, and without limitation, the client service 102 might need to charge a credit card number for a customer for a purchase made through a merchant system. In order to perform the charge, a message must be sent to the payment processor 124 that includes the amount of the charge and the customer's credit card number. However, the credit card number (i.e. the high security data 122) is only available to authorized services executing within the high security zone 128.

In order to permit the client service 102 to interact with the payment processor 124 in a manner that does not require the client service 102 to have access to the high security data 122, the client service 102 generates a processor agnostic request 104. The processor agnostic request 104 describes the processing required by the client service 102 in a processor-agnostic format. That is, the format utilized by the processor agnostic request 104 is not specific to any particular payment processor 124. This allows client services 102 to be constructed in a manner that does not require knowledge of the particular interfaces and data formats utilized by payment processors 124. In one particular implementation, the processor agnostic request 104 is formatted using XML. The processor agnostic request 104 might be formatted in other ways in other configurations.

In one implementation, the client service 102 provides the processor agnostic request 104 to one or more online controllers or batch controllers 106. An online controller 106 provides functionality for connection management, static configuration management, upstream service authentication, and user authentication. In this regard, it should be appreciated that connection management may be broken up into connections to the processor specific plug-in service 108 (described below), connections to the SDTS 120 (described in greater detail below), and connections to payment processors 124. Upstream service authentication can be performed at the time a request 104 is received by the processor specific plug-in service 108. Upstream service authentication can be performed through whitelisting of authentication, authorization and accounting ("AAA") identities. User authentication can be performed at the time a user, such as a developer, needs to update a configuration for a payment processor 124 or perform operational tasks, or at another time.

A batch controller 106 provides similar functionality as that described just above for batch processing of requests to payment processors 124. However, in addition to the online controller tasks described above, a batch controller 106 provides functionality for building and transmitting batches of requests to payment processors 124. A batch controller 106 might also provide other functionality not specifically described herein for generating batches of requests to payment processors 124 and processing batches of reply messages.

The online controllers and batch controllers 106 can, in turn, provide the processor agnostic request 104 to the processor specific plug-in service 108 (which might be referred to herein simply as "the plug-in service 108"). The plug-in service 108 is a plug-in management service that manages processor integration plug-ins 110 (which might be referred to herein simply as "a plug-in 110" or "plug-ins 110"). The plug-ins 110 include payment processor 124 specific program code that is executed within its own virtual machine in one particular configuration. The plug-ins 110 can have their own development environment to allow for separate management by developers and can be assigned their own AAA identity in some configurations.

The plug-ins 110 can be registered with the plug-in service 108 at runtime and can perform message transformation and transmission. For example, and without limitation, the plug-ins 110 can utilize the processor agnostic request 104 to generate a processor specific request 112. A processor specific request 112 is a request that is formatted according to the requirements of a particular payment processor 124. For example, a processor specific request 112 might be formatted using XML, SOAP, CSV, fixed field length formatting, or in another manner as required for compatibility with a particular payment processor 124. The processor specific request 112 does not, however, include high security data 122 (e.g. a customer's credit card or bank account number) until processed by the SDTS 120 in the manner described below.

The plug-ins 110 also specify to the SDTS 120 one or more processor request schemas 114. For example, and without limitation, a plug-in 110 might specify a format schema that defines the fields and format of the processor specific request 112. As will be described in greater detail below, the SDTS 120 can utilize the format schema in order to populate the processor specific request 112 with high security data 122.

The processor schemas 114 can also include a security classification schema that defines a security level (e.g. low, high, etc.) for the fields of the processor specific request 112. As will also be described in greater detail below, such a security classification schema can be utilized in order to validate the privileged operations performed on the processor specific request 112. For example, and without limitation, the security classification schema can be utilized to verify that the privileged operations performed by the SDTS 120 do not place high security data 122 into fields of the processor specific request 112 that are defined as containing only low security data. In this way, the schemas 114 can be utilized to ensure that a field in a processor specific request 112 can only be populated with high security data 122 inside the high security zone 128 and that replies returned from the high security zone 128 do not include high security data 122. Additional details regarding this process are provided below.

It should be appreciated that the schemas 114 might be provided with the processor specific request 112. Alternately, the processor specific request 112 might provide a reference to the processor request schemas 114. Other mechanisms might also be utilized to specify the processor request schemas 114 to the SDTS 120 in other configurations.

Because the processor request schemas 114 prevent high security data 122 from being taken out of the high security zone 128, the schemas 114 must also be secured with the same level of access as program code deployed to the high security zone 128. This is achieved in one configuration by enforcing the requirement that all schemas 114 sent into the high security zone 128 be accompanied by a schema hash-based message authorization code ("HMAC") that has been generated by a private key inside the high security zone 128. This private key is stored inside of the high security zone 128 and can be utilized by an authorized user in the high security zone 128 to generate a schema HMAC after having validated that the schema 114 will not leak high security data 122 from the high security zone 128. Other mechanisms might also be utilized in other configurations.

The plug-ins 110 can also specify one or more privileged operations 116. A privileged operation 116 is an action that can be invoked from within the high security zone 128 based on instructions received from outside the high security zone 128. Privileged operations 116 typically have side-effects that transform a message before the message is sent outside the high security zone 128. These side-effects, however, are limited by the data policies set forth in the processor request schemas 114. This allows the payment processor 124 specific logic outside the high security zone 128 (i.e. the plug-ins 110) to instruct the SDTS 120 to populate the processor specific request 112 with high security data 122 without permitting the plug-ins 110 to have access to the high security data 122. The set of permitted privileged operations 116 is typically limited, static, and deployed to the high security zone 128 by an authorized developer.

In order to maintain the security of the system disclosed herein, privileged operations 116 should not log inputs or outputs, should not throw exceptions containing inputs or outputs, and should not pass inputs or outputs to dependencies that are not designed to handle the data at the security level the operation is defined at. For example, and without limitation, privileged operations 116 performed in the high security zone 128 should not pass inputs or outputs to external services or services that are not designed to handle high security data 122. Other restrictions might also be placed on manner in which privileged operations 116 are performed in other configurations.

The plug-ins 110 can also specify a transmission configuration 118. A transmission configuration 118 defines how a processor specific request 112 is to be transmitted to a payment processor 124. For example, and without limitation, a transmission configuration 118 might specify which payment processor 124 endpoint to connect to and data for use in authenticating the payment processor 124. The transmission configuration 118 can also specify other data for use in establishing a connection with and communicating with a payment processor 124. The transmission configuration 118 might be provided to the SDTS 120 with the processor specific request or a reference to the transmission configuration 118 might be provided. Additionally, various security mechanisms might be utilized to verify that the transmission configuration 118 is valid such as, but not limited to, a whitelist identifying valid transmission configurations 118, cryptographic signing of the transmission configuration 118, access controls, and others.

As discussed briefly above, the SDTS 120 receives the processor specific request 112, the processor request schemas 114, data identifying the privileged operations 116, and the transmission configuration 118 from a processor integration plug-in 110. The SDTS 120 is a processor-agnostic message transformation and transmission service. The SDTS 120 remains payment processor 124 agnostic by defining generic transmission and transformation components that are controlled by specified processor request schemas 114, privileged operations 116, and the transmission configuration 118.

The SDTS 120 validates the schema HMAC described above and loads the processor request schemas 114. The SDTS 120 then executes the privileged operations 116 specified by the plug-in 110. For example, and without limitation, the SDTS 120 might populate the processor specific request 112 with high security data 122. The SDTS 120 can also validate the specified data policies to ensure that the privileged operations 116 are not violating the security classification schema described above. For example, and without limitation, the security classification schema can be utilized to ensure that credit card information is not being written to any fields designated as storing non-high security zone data. The SDTS 120 might then utilize the transmission configuration 118 to transmit the processor specific request 112, including the high security data 122, to the specified payment processor 124 for processing. Additional details regarding the operations described above with regard to FIG. 1 will be provided below with regard to FIGS. 2A-2B, 5 and 6.

Figure 2A:
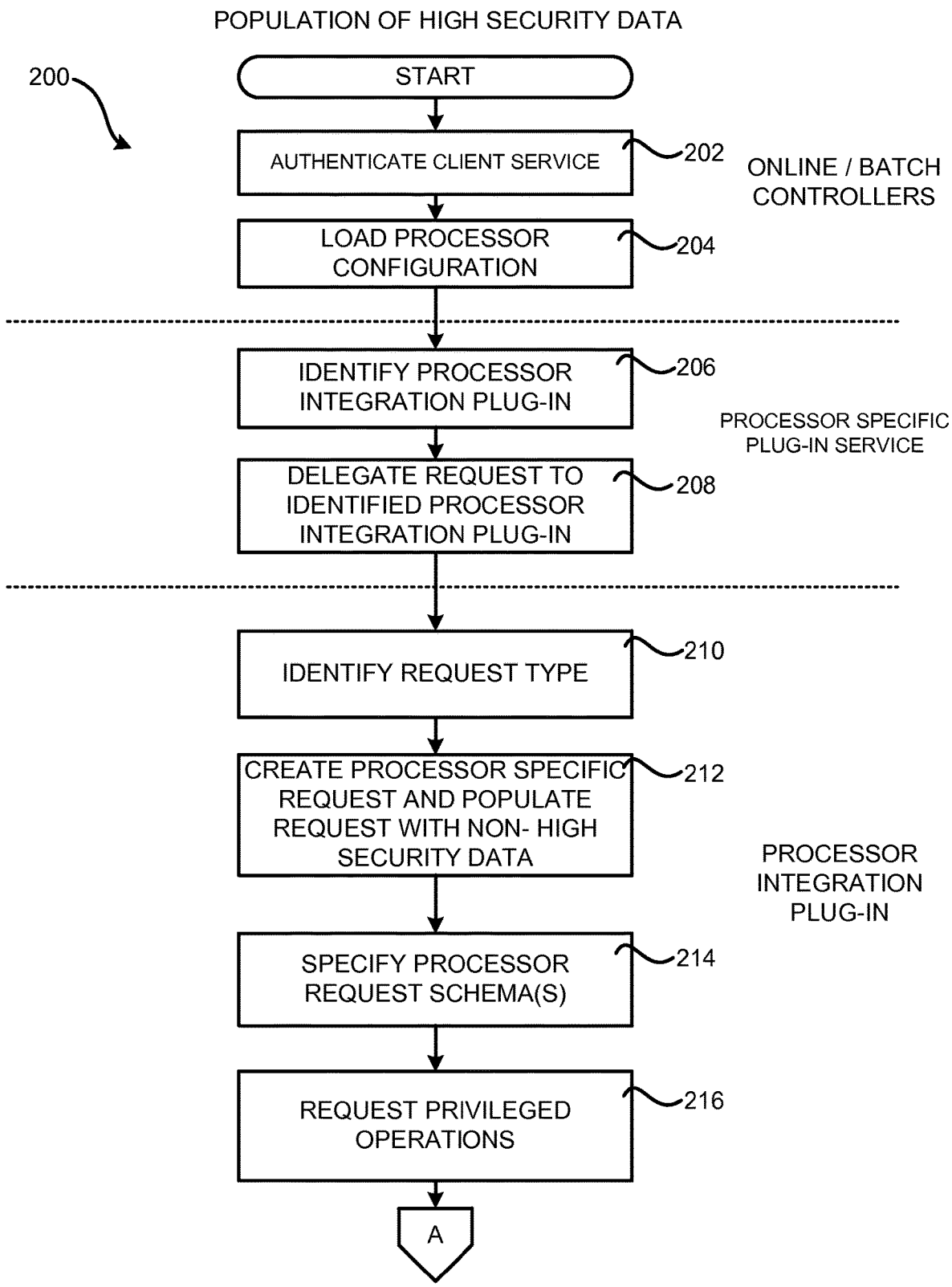
FIGS. 2A and 2B are flow diagrams showing aspects of one illustrative routine disclosed herein for remote population of high security data.
Figure 2B:
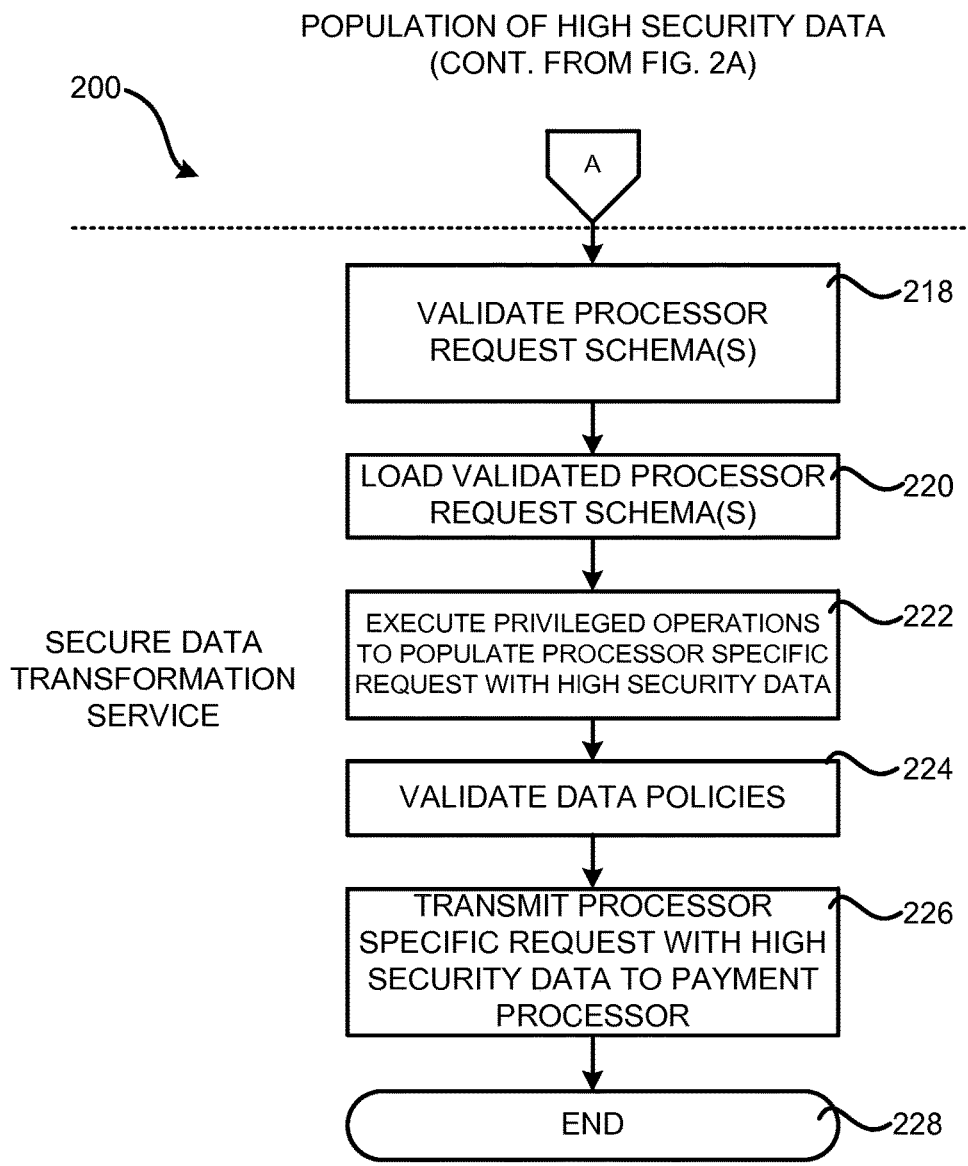

FIGS. 2A and 2B are flow diagrams showing aspects of an illustrative routine 200 disclosed herein for remote population of high security data 122. It should be appreciated that the logical operations described herein with respect to FIG. 2, and the other FIGS. might be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

The routine 200 begins at operation 202, where a client service 102 generates a processor agnostic request 104 and provides the request 104 to an online controller or batch controller 106. The online or batch controller 106 authenticates the client service 102. If the client service 102 can be authenticated, the routine 200 proceeds to operation 240, where the online or batch controller 106 loads the configuration for the appropriate processor 124. The online or batch controller 106 then provides the processor agnostic request 104 to the processor specific plug-in service 108.

From operation 204, the routine 200 proceeds to operation 206, where the processor specific plug-in service 108 identifies the plug-in 110 that is configured for use with the appropriate processor 124. The processor specific plug-in service 108 then delegates the processing of the processor agnostic request 104 to the plug-in 110 identified at operation 206.

At operation 210, the plug-in 110 identifies the request type for the processor agnostic request 104. The routine 200 then proceeds to operation 212, where the plug-in 110 creates the processor specific request 112 and, potentially, populates the request 112 with non-high security data relating to the customer. The routine 200 then proceeds to operation 214, where the plug-in 110 specifies the processor request schemas 114. The plug-in then specifies the privileged operations 116 to be performed on the processor specific request 112 at operation 216. The plug-in 110 then provides the processor specific request 112, the processor request schemas 114 (and potentially an associated schema HMAC), the privileged operations 116, and the transmission configuration 118 to the SDTS 120. In some configurations, the online or batch controller 106 manages the communication with the SDTS 120 rather than the plug-in 110.

At operation 218, the SDTS 120 validates the processor request schemas 114. For example, the SDTS 120 might validate the schema HMAC described above in one particular configuration. Once the schemas 114 have been validated, the routine 200 proceeds to operation 220, where the SDTS 120 loads the validated schemas 114. The routine 200 then proceeds to operation 222, where the SDTS 120 executes the privileged operations 116 to populate the processor specific request 112 with the high security data 122. The routine 200 then proceeds from operation 222 to operation 224, where the SDTS 120 validates the data policies specified in the schemas 114 to ensure that high security data has not been placed into fields of the processor specific request 112 that have been designated as containing only low security data.

The routine 200 then proceeds from operation 224 to operation 226, where the SDTS 120 utilizes the transmission configuration 118 to transmit the processor specific request 112, including the high security data 122, to the payment processor 124 for processing. The payment processor 124 may then process the request 112 and return a reply in response thereto. Processing of such a reply received from the payment processor 124 is described in greater detail below with regard to FIGS. 3 and 4. From operation 226, the routine 200 proceeds to operation 228, where it ends.

Figure 3:
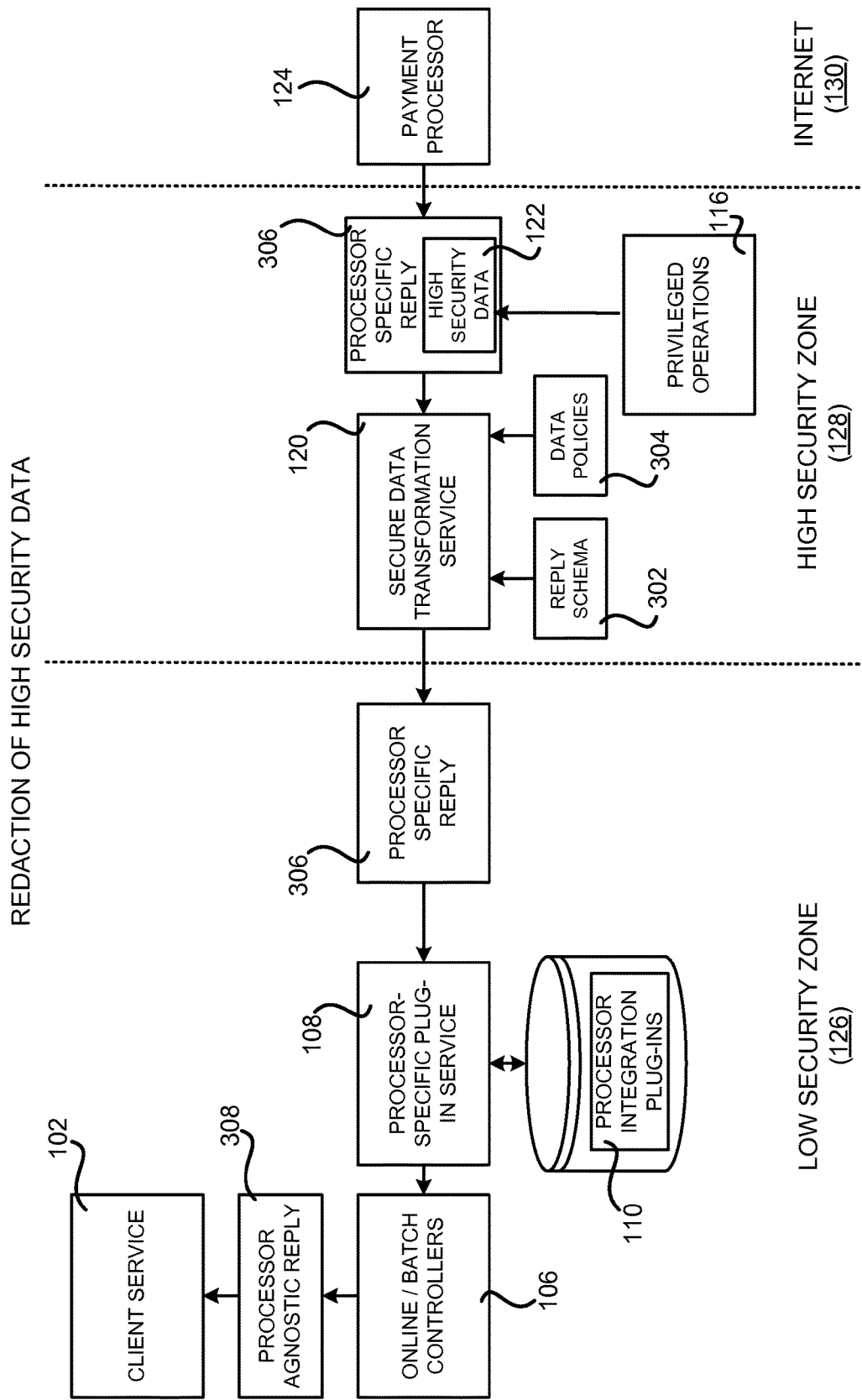
FIG. 3 is a software architecture diagram showing an overview of one illustrative mechanism described herein for remote redaction of high security data.

FIG. 3 is a software architecture diagram showing an overview of one illustrative mechanism described herein for remote redaction of high security data 122. As discussed briefly above, the payment processor 124 may generate a processor specific reply 306 (which might be referred to herein as an "incoming message") that includes high security data 122. In order to ensure that the high security data 122 does not exit the high security zone 128, a mechanism similar to that described above with regard to FIGS. 1 and 2A-2B can be utilized to redact or remove the high security data 122 from the reply 306. This mechanism can also be utilized to reduce the security classification of the high security data 122 in other ways, such as by tokenizing the high security data 122. It should be appreciated that although the processor specific reply 306 is primarily described herein as a "reply" provided by a payment processor 124 in response to a request 112, the technologies disclosed herein can be utilized to process other types of incoming messages to the high security zone 128 that include high security data 122. Accordingly, the processor specific reply 306 described herein is not limited to being a reply to a request 112.

As shown in FIG. 3, the SDTS 120 receives the reply 306 from the payment processor 124. In response thereto, the SDTS 120 utilizes a reply schema 302 and/or one or more data policies 304 to remove or redact high security data 122 from the reply 306. For example, and without limitation, a credit card number contained in a reply 306 can be removed completely or redacted to indicate only the last four digits of the credit card number. The high security data 122 might be redacted or modified in other ways to ensure that the high security data 122 is not released outside the high security zone 128. As mentioned above, other operations might also be performed to lower the security classification of the high security data 122, such as tokenizing, encrypting, or obfuscating the high security data 122 in other ways.

It should be appreciated that the reply schema 302 and the data policies 304 can be provided to the SDTS 120 in various ways. For example, and without limitation, a processor specific request 112 can not only specify the request schemas 114, but can also specify the reply schema 302 and the data policies 304. The reply schema 302 and/or one or more data policies 304 can be identified to the SDTS 120 in other ways in other configurations. The reply schema 302 and/or one or more data policies 304 can also be pre-loaded in order to improve performance of the SDTS 120.

Once the SDTS 120 has removed or redacted the high security data 122, the SDTS 120 provides the modified reply 306 to the appropriate processor integration plug-in 110. In turn, the processor integration plug-in 110 generates a processor agnostic reply 308 and provides the processor agnostic reply 308 to an online or batch controller 106. The online or batch controller 106 can then provide the processor agnostic reply 308 to the client service 102 that submitted the original processor agnostic request 104 (shown in FIG. 1). Additional details regarding the processing of a processor specific reply 112 will be provided below with regard to FIG. 4.

Figure 4:
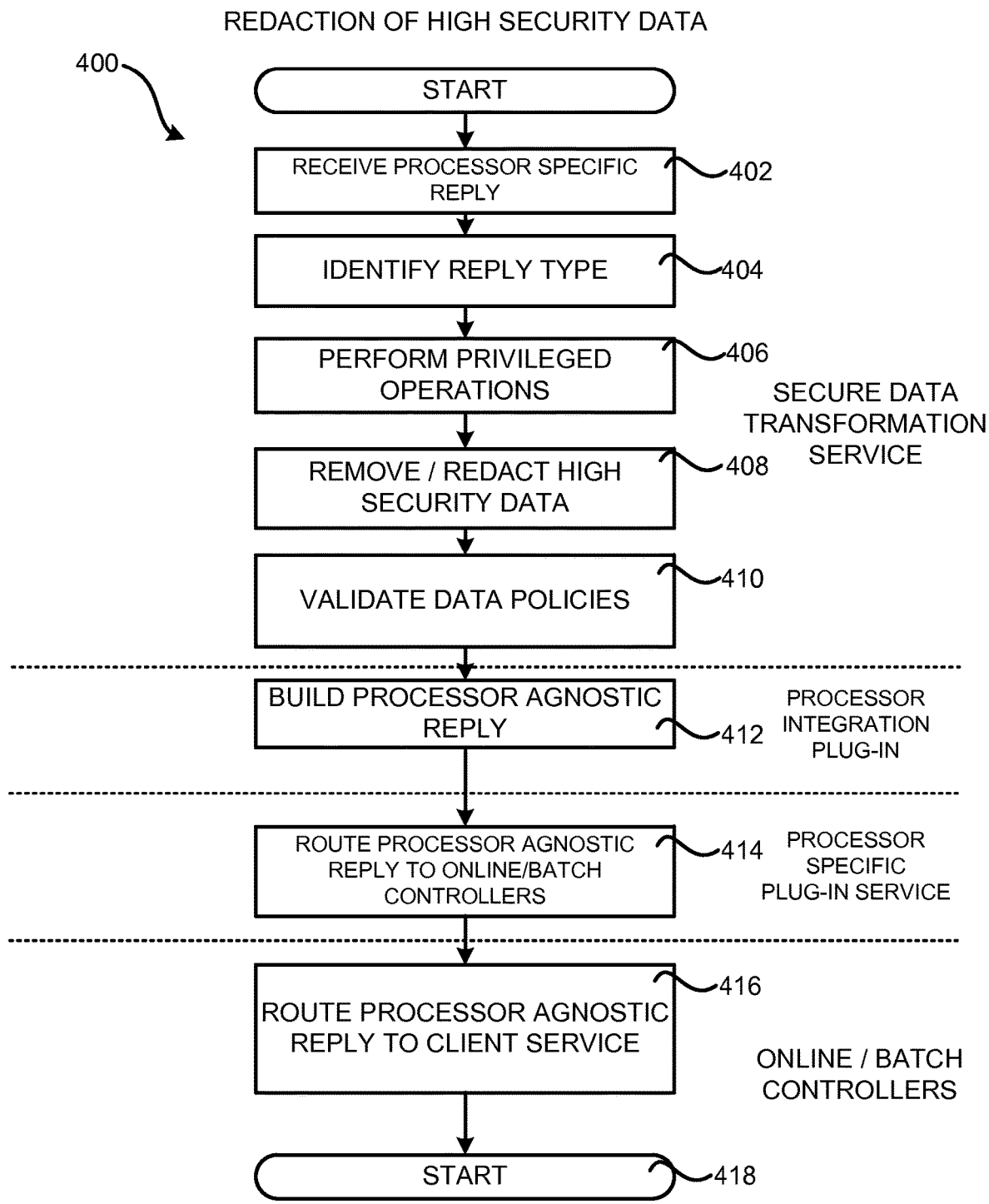
FIG. 4 is a flow diagram showing aspects of one illustrative routine disclosed herein for remote redaction of high security data.

FIG. 4 is a flow diagram showing aspects of one illustrative routine 400 disclosed herein for remote redaction of high security data 122 according to the configuration shown in FIG. 3. The routine 400 begins at operation 402, where the SDTS 120 receives a processor specific reply 306 that contains high security data 122. The routine 400 then proceeds to operation 404, where the SDTS 120 identifies the reply type for the reply 306. The reply type can then be utilized to identify the reply schema 302 and data policies 304 associated with the reply 306. Once the reply schema 302 and the data policies 304 associated with the reply 306 have been identified, the routine 400 proceeds to operation 406, where the SDTS 120 may perform one or more privileged operations 116. For example, and without limitation, the SDTS 120 might remove high security data 112 at operation 408 from the reply 306. The SDTS 120 might also redact high security data 122 contained in the reply 306 and/or modify the reply 306 in other ways. For example, and without limitation, the SDTS 120 might tokenize the high security data 122 and provide the token in the reply 306. The SDTS 120 might also encrypt the high security data 122.

At operation 410, the SDTS 120 validates the data policies 304 for the reply 306 to ensure that fields of the reply 306 designated as containing low security data do not contain high security data. Other types of validation operations on the fields of the reply 306 might also be performed. As discussed above, the data policies 304 can be utilized to restrict the privileged operations 116 that are performed on the reply 306. The SDTS 120 then provides the reply 306 to the appropriate processor integration plug-in 110.

At operation 412, the plug-in 110 builds the processor agnostic reply 308 and provides the processor agnostic reply 308 to the processor specific plug-in service 108. At operation 414, the processor specific plug-in service 108 routes the processor agnostic reply 308 to the appropriate online or batch controller 106. At operation 416, the online or batch controller 106 routes the processor agnostic reply 308 to the client service 104 that submitted the original processor agnostic request 104. The routine 400 then proceeds to operation 418, where it ends.

It should be appreciated that the reply 308 might not be provided at all to a request 104. In some configurations, a reply 308 is provided but is not provided synchronously to a request 104. In such a configuration, computing systems within or external to the high security zone 128 can perform processing to correlate a reply 308 with a corresponding request 104.

Figure 5:
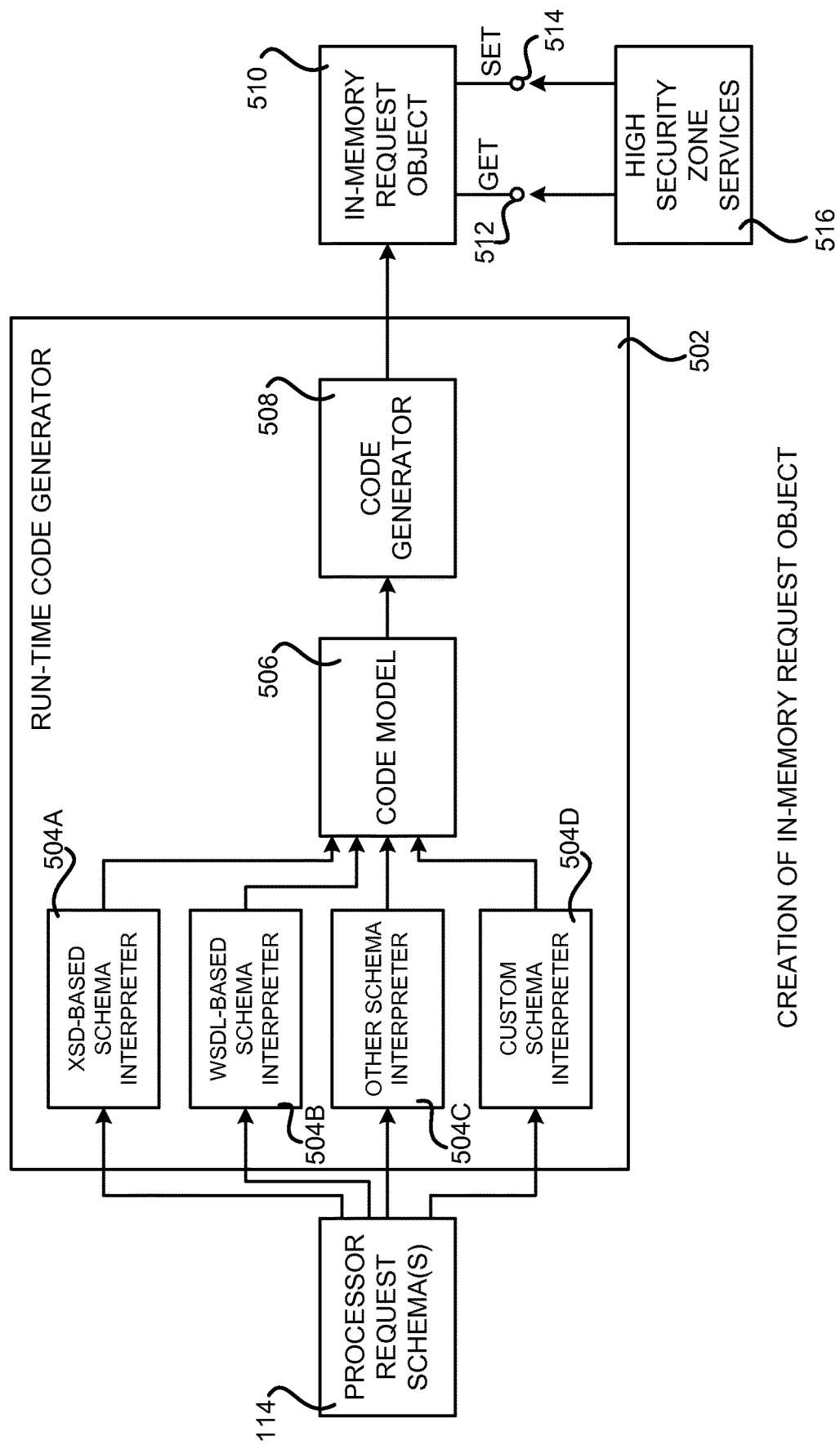
FIG. 5 is a software architecture diagram showing an overview of one illustrative mechanism described herein for creating an in-memory request object.

FIG. 5 is a software architecture diagram showing an overview of one illustrative mechanism described herein for creating an in-memory request object 510. As discussed briefly above, in one configuration the SDTS 120 creates an in-memory request object 510 that includes a "getter" method 512 and a "setter" method 514 that can be utilized by services 516 executing within the high security zone 128 in order to read and set fields of the in-memory request object 510, respectively, with the appropriate high security data 112. The processor specific request 112 can then be generated from the in-memory request object 510 and transmitted to the appropriate payment processor. FIG. 5 illustrates aspects of the creation and utilization of the in-memory request object 510 according to one particular configuration.

As shown in FIG. 5, a run-time code generator 502 is utilized in one configuration to generate the in-memory request object 510. The run-time code generator 502 includes one or more interpreters 504 that are selected and utilized based upon the format of the processor request schema 114. For example, an XSD-based schema interpreter 504A might be selected and utilized for a schema 114 defined using XSD and an WSDL-based schema interpreter 504B might be selected and utilized for a schema 114 defined using WSDL. Other schema interpreters 504C, including custom schema interpreters 504D, might be utilized to interpret schemas 114 that have been structured in other ways.

The run-time code generator also utilizes a code model 506 in conjunction with a code generator 508 to create the in-memory request object 510 in one configuration. The in-memory request objet 510 is implemented using JAVA BEANS in one particular configuration. Other technologies might also be utilized in other configurations.

The interpreters in FIG. 5 read the processor request schemas 114 and convert the schemas 114 to a code model 506 that describes the in-memory request object 510 to be generated. For instance, WSDL and XSD support can implemented by generating a JAVA code model 506 using the standard library XJC. For formats that do not have standard library support, custom interpreters 504 can be implemented to generate this code model. The interpreters 504 allow the code generator 508 to only need to understand the code model 506 generated by the interpreters. Otherwise the code generator 508 would need to be re-written for each format.

In one particular configuration, the code model 506 consists of two parts: (1) a description of a message and its fields; and (2) annotations for a message and its fields that describe additional metadata about those fields. For example, an authorization request for a payment processor 124 might contain a message ("Authorize") and fields within that message ("credit card number", sub-messages, etc.). This is used as a descriptor of which JAVA BEANS need to be generated in one particular configuration.

Annotations for the messages and fields described above might contain information that allows the SDTS 120 to read and write the messages from and to a network. For example, the JAVA serialization library JAXB uses JAXB-specific annotations on message fields in order to know how whether a field within a message is representing using an XML attribute or an XML sub-element. With this extra metadata it is then able to serialize and deserialize the message to and from memory. This kind of metadata usually comes from the processor message schema 114 (eg. XSDs, WSDLs). This is represented using a descriptor of which JAVA annotations should be added to the JAVA BEANS in one particular configuration.

Annotations for the messages and fields described above might also contain information required to allow the SDTS 120 to recognize the data classification of the fields within a message. For instance, it may be necessary for SDTS 120 to understand which field represents a key for a message so that it can properly route the reply to the correct client service 102 that sent that request 104. This might also be represented using a descriptor of the JAVA annotations that are to be added to the JAVA BEANS as described above.

In order to build the code model 506 that goes to the code generator 508, a descriptor of the JAVA BEANS to be generated may be created along with the annotations and fields described above by reading the processor message schemas 114 (eg. XSDs, WSDLs). This represents a "basic" code model 506 necessary only for serialization and deserialization of the message. The code model 506 can then be optionally further annotated with additional metadata as discussed above as the use-cases require.

The code generator then generates the in-memory JAVA BEAN representations (i.e. the in-memory request object 510) from the code model 506. It does this in one particular configuration using a translation from the code model 506 to the API of a library called JAVAASSIST. JAVAASSIST is a library that is utilized in one configuration to then generate the in-memory request object 510. Additional details regarding the creation and utilization of an in-memory request object 510 will be provided below with regard to FIG. 6. In this regard, it should be appreciated that the mechanism described above with regard to FIG. 5 is merely illustrative and that other technologies can be utilized to generate the in-memory request object 510.

Figure 6:
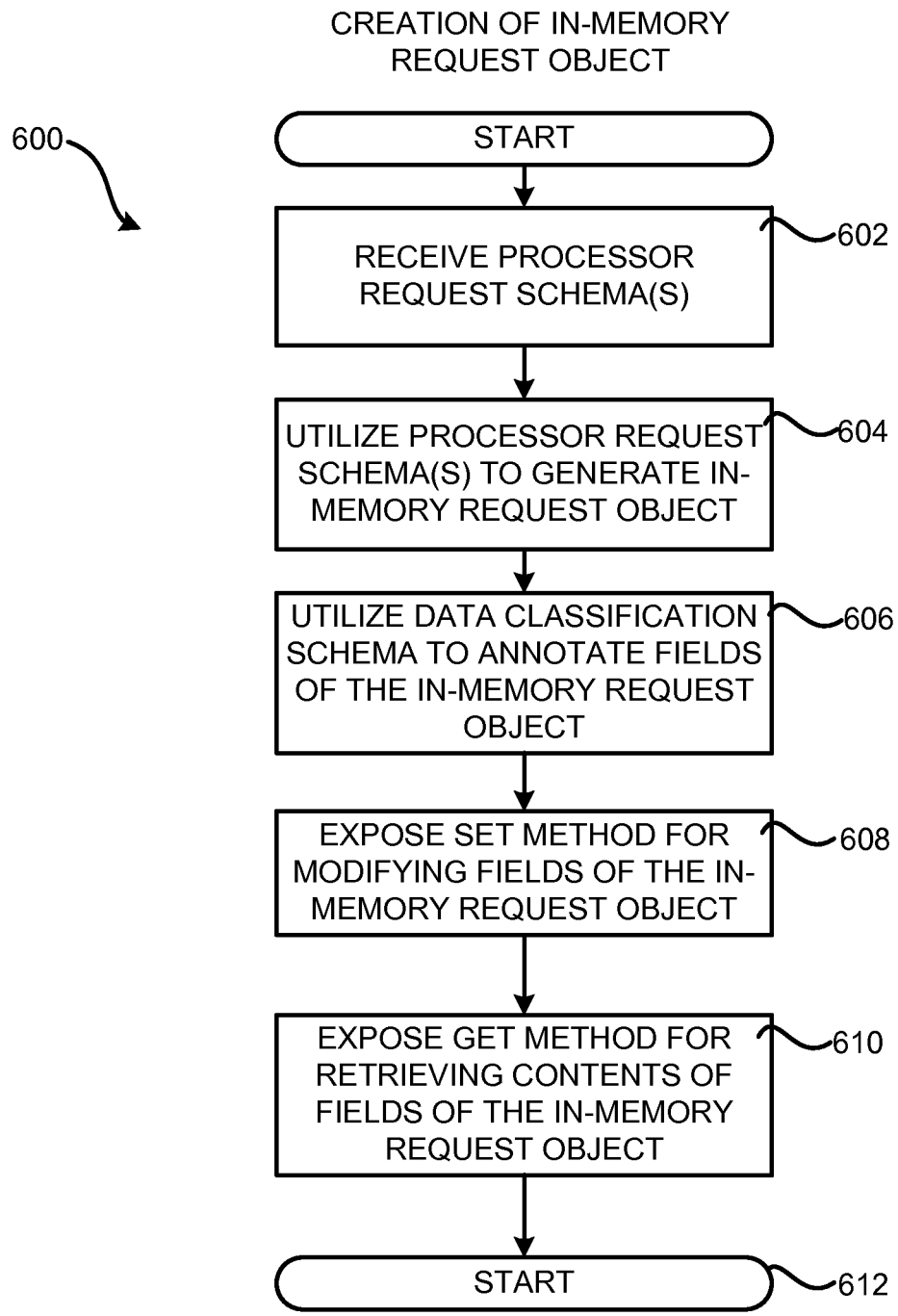
FIG. 6 is a flow diagram showing aspects of one illustrative routine disclosed herein for creating an in-memory request object.

FIG. 6 is a flow diagram showing aspects of one illustrative routine 600 disclosed herein for creating an in-memory request object 510 in the manner illustrated in FIG. 5. The routine 600 begins at operation 602, where the run-time code generator 502 receives the processor request schemas 114. The routine 600 then proceeds to operation 604, where the run-time code generator 502 utilizes the schemas 114 to generate the in-memory request object 510 in the manner described above with regard to FIG. 5 and to populate the fields of the in-memory request object 510. In some configurations, a performance optimization is utilized wherein a descriptor for the in-memory request object 510 is created prior to receiving a request 112 or a reply 306. An instance of the in-memory request object 510 is then created using the descriptor and populated at the time the request 112 or reply 306 is received. Other types of performance optimizations might also be utilized.

From operation 604, the routine 600 proceeds to operation 606, where the data classification schema described above can be utilized to annotate fields of the in-memory request object 510. For example, and without limitation, the fields can be annotated to indicate the security level of data stored in the fields. Other types of annotations can also be made.

From operation 606, the routine 600 proceeds to operation 608, where the in-memory request object 510 exposes the setter method 514 for use by high security zone services 516 in setting the contents of fields of the object 510 to perform the privileged operations 116. Similarly, at operation 610, the in-memory request object 510 exposes the getter method 512 for use by high security zone services 516 in reading the contents of fields of the object 510 to perform the privileged operations 116. The in-memory request object 510 might expose other methods for use by the high security zone services 516 in other configurations.

From operation 610, the routine 600 proceeds to operation 612, where it ends. It should be appreciated that while FIGS. 5 and 6 have been presented in the context of creating an in-memory request object 510, a similar mechanism can also be utilized to create an in-memory reply object (not shown in the FIGS.) that exposes getter and setter methods for use by high security services 516 in performing the privileged operations 116. The processor specific reply 306 can be generated from the in-memory reply object.

It should be appreciated that the mechanism described above can be utilized in configurations other than those described specifically above. For example, and without limitation, when requests and replies are exchanged with a payment processor 124 that do not include high security data 112, the processor-specific plug-in service 108 can communicate directly with the payment processor 124 without the use of the SDTS 120. In another configuration, the mechanism described above can be utilized to process requests initiated by payment processors 124. Additionally, the SDTS 120 might redact, remove, tokenize, encrypt, or perform other modifications on high security data 112 in order to lower the security level of the high security data 112 prior to transmission to a payment processor 124 or another type of endpoint. Other transformations might also be applied by the SDTS 120 or by services that operate between the SDTS 120 and the processor specific plug-in service 108. Other configurations can also be utilized.

Figure 7:
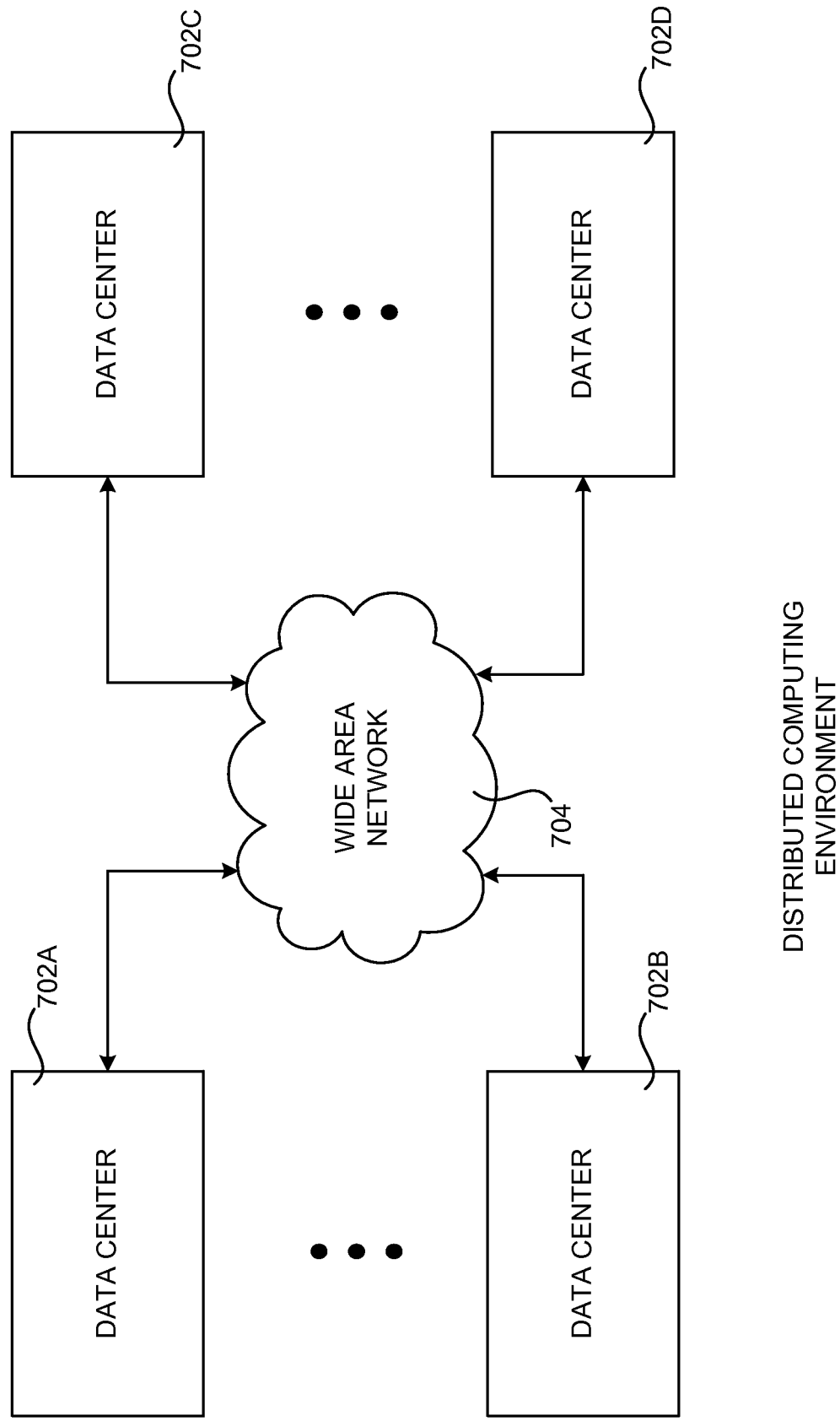
FIG. 7 is network diagram showing aspects of a distributed computing environment in which the configurations presented herein can be implemented.

FIG. 7 is a network diagram showing aspects of a distributed computing environment that can be utilized to provide an operating environment for the technologies disclosed herein. In particular, the distributed computing environment shown in FIG. 7 can provide a suitable computing environment in which the technologies described herein can be implemented. The distributed computing environment shown in FIG. 7 is configured using a service-oriented architecture in one implementation. Other configurations can also be utilized.

The distributed computing environment shown in FIG. 7 can provide computing resources for executing distributed programs on a permanent or an as-needed basis. The computing resources provided by the distributed computing environment can include various types of resources, such as data processing resources, data storage resources, data communication resources, and the like. Each type of computing resource can be general-purpose or can be available in a number of specific configurations. For example, data processing resources can be available as virtual machine instances. The instances can be configured to execute programs, including Web servers, application servers, media servers, database servers, and other types of components such as those described in detail above. Data storage resources can include file storage devices, block storage devices, and the like. Each type or configuration of computing resource can be available in different sizes, such as large resources, consisting of many processors, large amounts of memory, and/or large storage capacity, and small resources consisting of fewer processors, smaller amounts of memory, and/or smaller storage capacity.

The computing resources provided by the distributed computing environment shown in FIG. 7 are furnished in one configuration by server computers and other components operating in one or more data centers 702A-702D (which might be referred to herein singularly "as a data center 702" or collectively as "the data centers 702"). The data centers 702 are facilities utilized to house and operate computer systems and associated components for providing a distributed computing environment. The data centers 702 typically include redundant and backup power, communications, cooling, and security systems. The data centers 702 can also be located in geographically disparate locations. One illustrative configuration for a data center 702A that implements aspects of the technologies disclosed herein for remote population and redaction of high security data will be described below with regard to FIG. 8.

Users of the distributed computing environment illustrated in FIG. 7 can access the computing resources provided by the data centers 702 over a wide-area network ("WAN") 704, such as the Internet 130. Although a WAN 704 is illustrated in FIG. 7, it should be appreciated that a local-area network ("LAN"), the Internet, or any other networking topology known in the art that connects the data centers 702 to remote customers and other users can be utilized. It should also be appreciated that combinations of such networks can also be utilized.

The distributed computing environment can provide various interfaces through which aspects of its operation can be configured. For instance, various APIs can be exposed by components operating in the distributed computing environment shown in in FIG. 7 for configuring various aspects of its operation and for utilizing various aspects of the functionality that it provides. Other mechanisms for configuring the operation of components in the distributed computing environment and for utilizing these components can also be utilized.

According to configurations disclosed herein, the capacity of resources provided by the distributed computing environment can be scaled in response to demand. In this regard, scaling refers to the process of instantiating (which might also be referred to herein as "launching" or "creating") or terminating (which might also be referred to herein as "de-scaling") instances of computing resources in response to demand. Auto scaling is one mechanism for scaling computing resources in response to increases or lulls in demand for the resources. Additional details regarding the functionality provided by the data centers 702 will be provided below with regard to FIG. 8.

Figure 8:
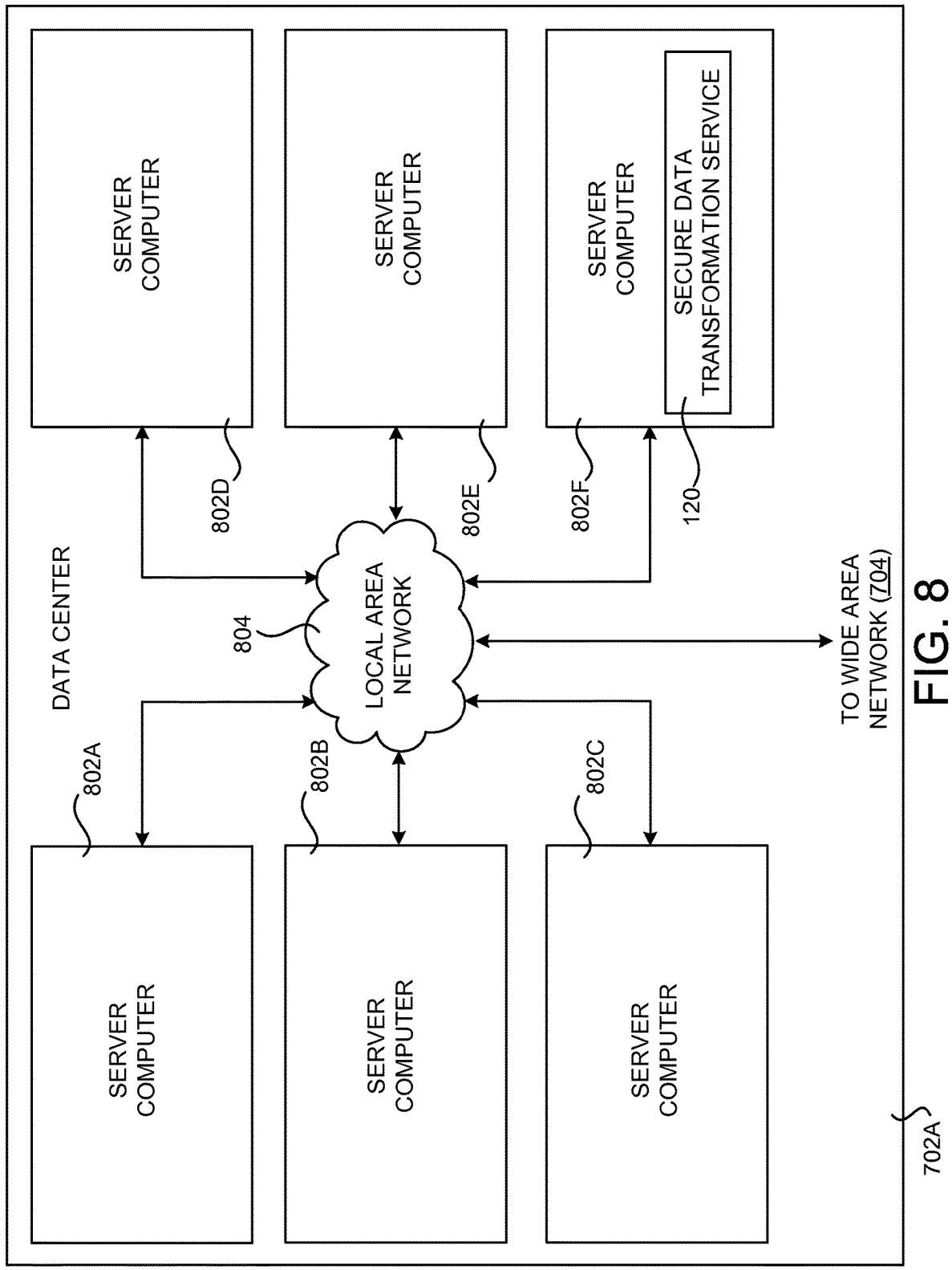
FIG. 8 is a network diagram illustrating aspects of a data center that can be utilized to implement the various technologies presented herein.

FIG. 8 is a computing system diagram that illustrates a configuration for a data center 802A that can be utilized to implement the technologies described herein. The example data center 702A shown in FIG. 8 includes several server computers 802A-802F (which might be referred to herein singularly as "a server computer 802" or in the plural as "the server computers 802") for providing computing resources for executing distributed programs, such as those described in detail above.

The server computers 802 can be standard tower or rack-mount server computers configured appropriately for executing a distributed program or providing other functionality. The data center 702A shown in FIG. 8 also includes one or more server computers 802, such as the server computer 802F, that execute software components for providing aspects of the functionality described above. In particular, the server computer 802F can execute the secure data transformation service 120. The server computer 802F can also execute other software components not specifically shown in FIG. 8. In this regard, it should be appreciated that portions of the data center 702A might be designated a low security zone 126 and other portions of the data center 702A might be designated as a high security zone 128. In the example configuration shown in FIG. 8, the server computer 802F is located in the high security zone 128.

In the example data center 702A shown in FIG. 8, an appropriate LAN 804 is utilized to interconnect the server computers 802. The LAN 804 is also connected to the WAN 704 illustrated in FIG. 7. It should be appreciated that the network topology illustrated in FIGS. 7 and 8 has been greatly simplified for discussion purposes and that many more networks and networking devices can be utilized to interconnect the various computing systems disclosed herein. Appropriate load balancing devices or software modules can also be utilized for balancing a load between each of the data centers 702, between each of the server computers 802 in each data center 702, or between virtual machine instances executing within the distributed computing environment. These network topologies and devices should be apparent to those skilled in the art.

It should also be appreciated that the data center 702A described with reference to FIG. 8 is merely illustrative and that other implementations can be utilized. Additionally, it should be appreciated that the disclosed functionality can be implemented in software, hardware or a combination of software and hardware. Other implementations should be apparent to those skilled in the art. Additional details regarding one computer architecture for implementing the server computers 802 will be described below with regard to FIG. 9.

Figure 9:
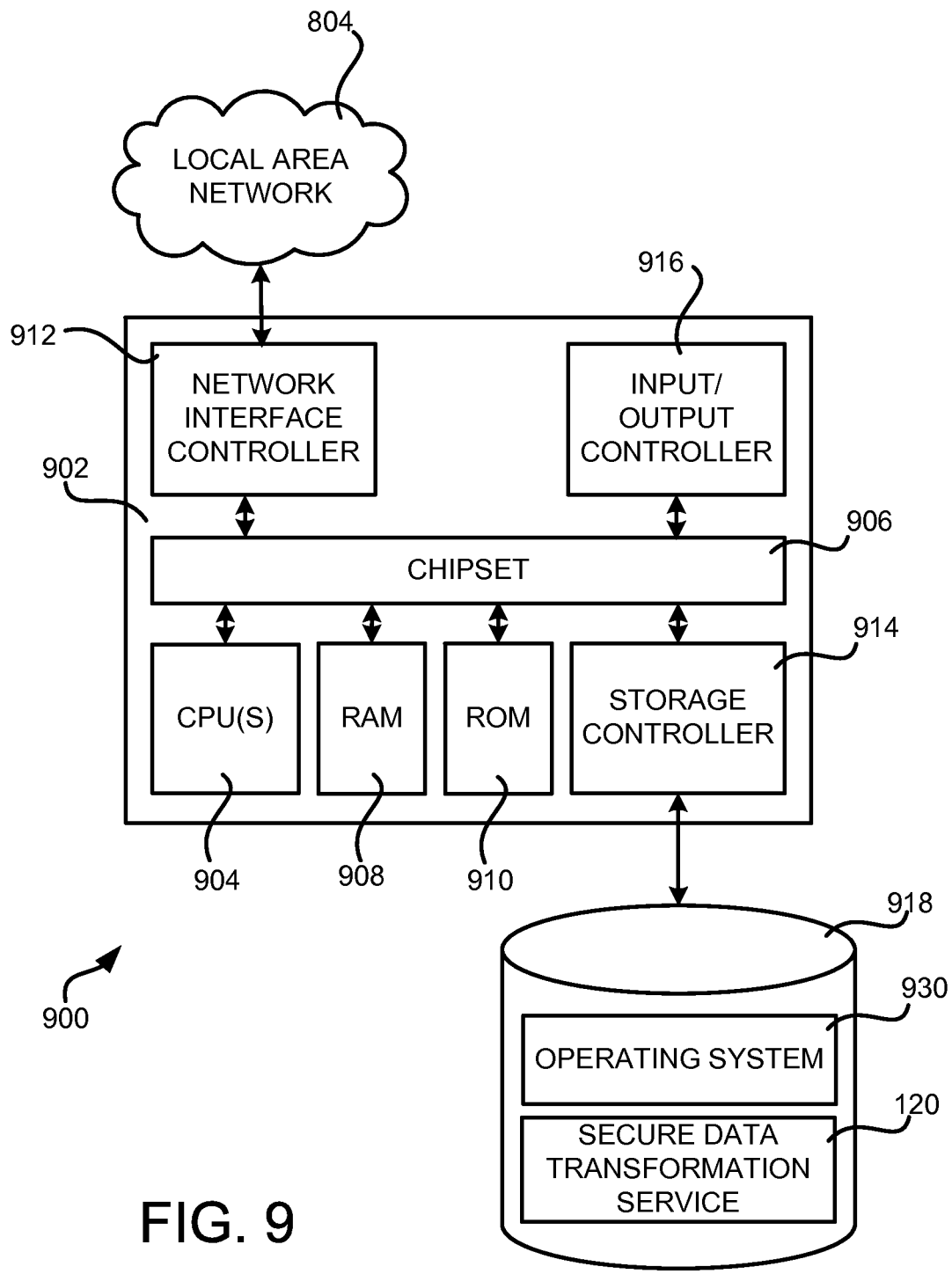
FIG. 9 is a computer architecture diagram showing an illustrative computer hardware architecture for implementing a computing device that might be utilized to implement aspects of the various configurations presented herein.

FIG. 9 shows an example computer architecture for a computer 900 capable of executing the program components described above for remote population and redaction of high security data. The computer architecture shown in FIG. 9 illustrates a conventional server computer, workstation, desktop computer, laptop, tablet, network appliance, personal digital assistant ("PDA"), e-reader, smartphone, or other computing device, and can be utilized to execute any aspects of the software components presented herein. For example, the computer architecture shown in FIG. 9 can be utilized to execute the various program components described above.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904, which might include one or more processor cores, operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a random access memory ("RAM") 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the local area network 804. The chipset 906 can include functionality for providing network connectivity through a NIC 912, such as a gigabit Ethernet adapter. The NIC 912 is capable of connecting the computer 900 to other computing devices over the network 804. It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store system programs, application programs, other program modules, and data, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can access other computer-readable storage media to store and retrieve information, such as program modules, data structures, or other data. It should be appreciated by those skilled in the art that computer-readable storage media can be any available media that provides for the storage of non-transitory data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other non-transitory medium that can be used to store the desired information in a non-transitory fashion.

The mass storage device 918 can store an operating system 930 utilized to control the operation of the computer 900. According to one configuration, the operating system comprises the LINUX operating system. According to another configuration, the operating system comprises the WINDOWS® SERVER operating system from MICROSOFT Corporation. According to further configurations, the operating system can comprise the UNIX operating system. It should be appreciated that other operating systems can also be utilized. The mass storage device 918 can store other system or application programs and data utilized by the computer 900, such as the secure data transformation service 120 and/or any of the other software components and data described above. The mass storage device 918 might also store other programs and data not specifically identified herein.

In one configuration, the mass storage device 918 or other computer-readable storage media is encoded with computer-executable instructions which, when loaded into the computer 900, transforms the computer from a general-purpose computing system into a special-purpose computer capable of implementing the configurations described herein. These computer-executable instructions transform the computer 900 by specifying how the CPUs 904 transition between states, as described above. According to one configuration, the computer 900 has access to computer-readable storage media storing computer-executable instructions which, when executed by the computer 900, perform the various routines described above with regard to FIGS. 2A-2B, 4, and 6. The computer 900 might also include computer-readable storage media for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, the input/output controller 916 can provide output to a display, such as a computer monitor, a flat-panel display, a digital projector, a printer, a plotter, or other type of output device. It will be appreciated that the computer 900 might not include all of the components shown in FIG. 9, can include other components that are not explicitly shown in FIG. 9, or might utilize an architecture completely different than that shown in FIG. 9. It should also be appreciated that many computers, such as the computer 900, might be utilized in combination to embody aspects of the various technologies disclosed herein.

Based on the foregoing, it should be appreciated that technologies for remote population and redaction of high security data have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A computer-implemented method, comprising:
receiving a request at a network service executing in a high security zone, the request comprising a payment processor specific request that does not include high security data, wherein the payment processor specific request comprises one or more payment processor request schemas and specifies one or more privileged operations;
utilizing the one or more payment processor request schemas within the high security zone to create an in-memory request object;
executing the one or more privileged operations specified in the request to populate the in-memory request object with the high security data, wherein the one or more payment processor request schemas limit the one or more privileged operations;
generating a payment processor specific request that includes the high security data from the in-memory request object; and
transmitting the payment processor specific request that includes the high security data to a payment processor.

2. The computer-implemented method of claim 1, wherein the one or more payment processor request schemas comprise a format schema defining a format of the payment processor specific request that includes the high security data.

3. The computer-implemented method of claim 1, further comprising validating the one or more payment processor request schemas prior to executing the one or more privileged operations.

4. The computer-implemented method of claim 1, further comprising:
receiving a payment processor specific reply that includes additional high security data at the network service executing in the high security zone; and
removing the additional high security data from the payment processor specific reply to generate a payment processor specific reply that does not include the additional high security data.

5. The computer-implemented method of claim 4, further comprising executing a payment processor integration plug-in to generate a payment processor agnostic reply from the payment processor specific reply that does not include the additional high security data.

6. The computer-implemented method of claim 1, further comprising executing a payment processor integration plug-in to generate the payment processor specific request that does not include high security data from a payment processor agnostic request.

7. The computer-implemented method of claim 1, wherein the one or more payment processor request schemas comprise a security classification schema defining a security level for one or more fields of the payment processor specific request that includes the high security data.

8. The computer-implemented method of claim 7, further comprising utilizing the security classification schema to validate the one or more privileged operations.

9. An apparatus, comprising:
one or more processors; and
at least one computer-readable storage medium having computer-executable instructions stored thereupon which, when executed by the one or more processors, cause the apparatus to:
receive a request at a network service executing in a high security zone, the request comprising an endpoint specific request that does not include high security data, wherein the endpoint specific request comprises one or more request schemas and specifies one or more privileged operations,
execute the one or more privileged operations specified in the request to generate an endpoint specific request that includes the high security data, wherein execution of the one or more privileged operations is limited by the one or more request schemas, and transmit the endpoint specific request that includes the high security data to an endpoint, the endpoint located outside the high security zone.

10. The apparatus of claim 9, wherein the computer-readable storage medium has further computer-executable instructions stored thereupon to utilize the one or more request schemas within the high security zone to create an in-memory request object, wherein the one or more privileged operations specified in the request are executed to populate the in-memory request object with the high security data, and wherein the endpoint specific request that includes the high security data is generated from the in-memory request object.

11. The apparatus of claim 9, wherein the endpoint comprises a payment processor.

12. The apparatus of claim 9, wherein the one or more request schemas comprise a format schema defining a format of the endpoint specific request that includes the high security data.

13. The apparatus of claim 9, wherein the computer-readable storage medium has further computer-executable instructions to:
receive an endpoint specific reply that includes additional high security data at the network service executing in the high security zone; and
remove the additional high security data from the endpoint specific reply to generate an endpoint specific reply that does not include high security data.

14. The apparatus of claim 9, wherein the one or more request schemas comprise a security classification schema defining a security level for one or more fields of the endpoint specific request.

15. A computer-readable storage medium having computer-executable instructions stored thereupon which, when executed by one or more processors, cause an apparatus to:
receive a request at a network service executing in a high security zone, the request comprising an endpoint specific message that is associated with an endpoint and does not include high security data, the endpoint comprising a payment processor, wherein the endpoint specific message specifies one or more privileged operations and comprises one or more request schemas; and
execute the one or more privileged operations specified in the request to generate an endpoint specific message that includes the high security data, wherein the execution of the one or more privileged operations is limited by the one or more request schemas.

16. The computer-readable storage medium of claim 15, having further computer-executable instructions stored thereupon to utilize the one or more request schemas within the high security zone to create an in-memory request object, wherein the one or more privileged operations specified in the request are executed to populate the in-memory request object with the high security data, and wherein the endpoint specific message that includes the high security data is generated from the in-memory request object.

17. The computer-readable storage medium of claim 15, wherein the one or more request schemas comprise a format schema defining a format of the endpoint specific message.

18. The computer-readable storage medium of claim 15, having further computer-executable instructions to:
receive an endpoint specific reply that includes additional high security data at the network service executing in the high security zone; and
remove the high security data from the endpoint specific reply to generate an endpoint specific reply that does not include the additional high security data.

19. The computer-readable storage medium of claim 15, wherein the one or more request schemas comprise a security classification schema defining a security level for one or more fields of the endpoint specific message.

20. The computer-readable storage medium of claim 15, having further computer-executable instructions to validate the one or more request schemas prior to executing the one or more privileged operations.

* * * * *